United States Patent
Alves et al.

(10) Patent No.: US 11,014,775 B1
(45) Date of Patent: *May 25, 2021

(54) PIPE DEPLOYMENT REEL ADAPTER SHAFT SYSTEMS AND METHODS

(71) Applicant: Trinity Bay Equipment Holdings, LLC, Houston, TX (US)

(72) Inventors: Geraldo Sendy Alves, Houston, TX (US); John Paul Leger, Baytown, TX (US); Jagtar Singh Thethy, Cypress, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,500

(22) Filed: Aug. 24, 2020

Related U.S. Application Data

(63) Continuation of application No. 16/791,691, filed on Feb. 14, 2020, now Pat. No. 10,787,339.

(51) Int. Cl.
  *B65H 75/42* (2006.01)
  *B65H 75/44* (2006.01)

(52) U.S. Cl.
  CPC ....... *B65H 75/425* (2013.01); *B65H 75/4442* (2013.01); *B65H 75/4478* (2013.01)

(58) Field of Classification Search
  CPC ...... B65H 49/32; B65H 59/04; B65H 49/325; B65H 75/425; B65H 75/4478; B65H 75/4442

USPC .......................................... 242/611, 612, 557
See application file for complete search history.

(56) References Cited

U.S. PATENT DOCUMENTS

| | | |
|---|---|---|
| 855,038 A | 5/1907 | Ball |
| 2,337,606 A | 12/1943 | Howsam |
| 2,635,827 A | 4/1953 | Stemm et al. |
| 3,258,219 A | 6/1966 | Mclendon |
| 3,482,607 A | 12/1969 | Villani et al. |
| 4,325,522 A | 4/1982 | Sauber |
| 5,060,882 A | 10/1991 | Rousculp et al. |
| 5,823,458 A | 10/1998 | Huang |
| 6,345,781 B1 | 2/2002 | Bowers |
| 8,876,032 B1 | 11/2014 | Gibbons et al. |
| 10,787,339 B1 * | 9/2020 | Alves ................... B65H 75/425 |
| 2012/0223179 A1 | 9/2012 | Gonzalez et al. |
| 2018/0118505 A1 | 5/2018 | Prince |
| 2018/0186269 A1 | 7/2018 | Barnett et al. |

* cited by examiner

*Primary Examiner* — William A. Rivera
(74) *Attorney, Agent, or Firm* — Conrad J. Hsu

(57) ABSTRACT

Techniques for implementing a pipe deployment system that includes a pipe reel, in which the pipe reel includes reel ends and a reel drum and the pipe reel enables a pipe segment to be wrapped on the reel drum. The pipe deployment system includes a brake assembly with a brake wheel having a shaft socket keyed with flat inner surfaces, and a shaft adapter assembly, which includes an adapter head to be coupled between the pipe reel and the brake assembly. The adapter head includes an adapter shaft keyed with flat outer surfaces, in which the adapter shaft matingly interlocks with the shaft socket and is to be partially inserted through a reel end of the pipe reel, and a rotation control pin coupled to the adapter shaft, in which the rotation control pin is to be inserted between adjacent reel spokes in the reel end of the pipe reel.

20 Claims, 10 Drawing Sheets

146 ⟶

148 ⟶
Move pipe deployment trailer to pipe reel installed with shaft adapter assembly

152 ⟶
Align adapter guide plate with trailer guide plate

154 ⟶
Expand width of pipe deployment trailer

150 ⟶
Engage shaft adapter assembly with brake assembly of pipe deployment trailer

156 ⟶
Align keyed adapter shaft with keyed shaft socket in brake assembly

158 ⟶
Lift shaft adapter assembly

160 ⟶
Contract width of pipe deployment trailer

FIG. 14

PIPE DEPLOYMENT REEL ADAPTER SHAFT SYSTEMS AND METHODS

The present disclosure is a continuation of U.S. patent application Ser. No. 16/791,691, entitled "PIPE DEPLOYMENT REEL ADAPTER SHAFT SYSTEMS AND METHODS" and filed on Feb. 14, 2020, which is incorporated herein by reference in its entirety for all purposes.

CROSS-REFERENCE

The present disclosure is a continuation of U.S. patent application Ser. No. 16/791,691, entitled "PIPE DEPLOYMENT REEL ADAPTER SHAFT SYSTEMS AND METHODS" and filed on Feb. 14, 2020, which is incorporated herein by reference in its entirety for all purposes.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments in addition to pipe fittings (e.g., connectors), such as a midline pipe fitting and/or a pipe end fitting. Generally, a pipe segment may include tubing, which defines (e.g., encloses) a bore that provides a primary fluid conveyance (e.g., flow) path through the pipe segment. More specifically, the tubing of a pipe segment may be implemented to facilitate isolating (e.g., insulating) fluid being conveyed within its bore from environmental conditions external to the pipe segment, for example, to reduce the likelihood of the conveyed (e.g., bore) fluid being lost to the external environmental conditions and/or the external environmental conditions contaminating the conveyed fluid.

Additionally, in some instances, a pipe deployment system, which includes a pipe deployment trailer and/or a pipe deployment frame, may be implemented and/or operated to facilitate deploying one or more pipe segments in a pipeline system. In particular, in some such instances, a pipe segment may be wrapped (e.g., spooled and/or coiled) on a pipe drum, which includes an outwardly extending drum shaft (e.g., axle) that is implemented to matingly interlock (e.g., interface and/or engage) with a shaft socket in a braking assembly in the pipe deployment system. In other instances, a pipe segment may be wrapped on a pipe reel that includes a reel drum coupled between a pair of reel ends. However, in some instances, a pipe reel on which a pipe segment is wrapped may not include a reel shaft (e.g., axle) that extends beyond its reel ends, thereby limiting the ability of a pipe deployment system to deploy the pipe segment directly from the pipe reel and, thus, potentially limiting operational flexibility and/or operational efficiency of the pipe deployment system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipe deployment system includes a pipe reel, in which the pipe reel includes a first reel end, a second reel end, and a reel drum coupled between the first reel end and a second reel end and the pipe reel enables a pipe segment including tubing that defines a pipe bore and a fluid conduit implemented in an annulus of the tubing to be wrapped on the reel drum. Additionally, the pipe deployment system includes a brake assembly, which includes a brake wheel having a shaft socket keyed with one or more flat inner surfaces, and a shaft adapter assembly, which includes an adapter head to be coupled between the pipe reel and the brake assembly to enable the pipe deployment system to control deployment speed of the pipe segment from the pipe reel using the brake assembly. The adapter head includes an adapter shaft keyed with one or more flat outer surfaces, in which the adapter shaft matingly interlock with the shaft socket of the brake assembly and is to be partially inserted through the first reel end of the pipe reel, and a rotation control pin coupled to the adapter shaft via a rotation control plate, in which the rotation control pin is to be inserted between adjacent reel spokes in the first reel end of the pipe reel.

In another embodiment, a method of implementing a pipe deployment system includes coupling a first adapter head of a shaft adapter assembly to a first side of a pipe reel on which a pipe segment is wrapped, in which the pipe reel includes a first reel end, a second reel end, and a reel drum coupled between the first reel end and the second reel end and coupling the first adapter head to the first side of the pipe reel includes partially inserting a first adapter shaft of the first adapter head through the first reel end of the pipe reel and inserting a rotation control pin of the first adapter head between adjacent reel spokes in the first reel end of the pipe reel to facilitate tying rotation of the shaft adapter assembly to rotation of the pipe reel, coupling a second adapter head of the shaft adapter assembly to a second side of the pipe reel opposite the first side of the pipe reel at least in part by partially inserting a second adapter shaft of the second adapter head through the second reel end of the pipe reel, and matingly interfacing the first adapter shaft of the first adapter head with a keyed shaft socket in a brake assembly of the pipe deployment system to facilitate controlling deployment speed of the pipe segment from pipe deployment system using the brake assembly at least in part by tying the rotation of the shaft adapter assembly to rotation of the brake assembly.

In another embodiment, a shaft adapter assembly to be deployed at a pipe reel includes an adapter shaft to be partially inserted through a shaft opening in a first reel end of the pipe reel, in which the pipe reel includes a pipe drum coupled between the first reel end and a second reel end, a rotation control plate coupled to the adapter shaft, a rotation control pin that extends out from the rotation control plate, in which the rotation control pin is to be inserted between reel spokes in the first reel end of the pipe reel to facilitate tying deployment speed of a pipe segment wrapped on the pipe reel to rotation of the shaft adapter assembly, and one or more flat outer surfaces keyed on the adapter shaft, in which the one or more flat outer surfaces align with corresponding flat inner surfaces implemented in a shaft socket of a brake assembly in a pipe deployment system to facilitate typing the rotation of the shaft adapter assembly to rotation of the brake assembly.

BRIEF DESCRIPTION OF DRAWINGS

FIG. 14 is a flow diagram of an example process for loading a pipe reel onto the pipe deployment trailer of FIG. 10, in accordance with an embodiment of the present disclosure.

DETAILED DESCRIPTION

Figure 1:
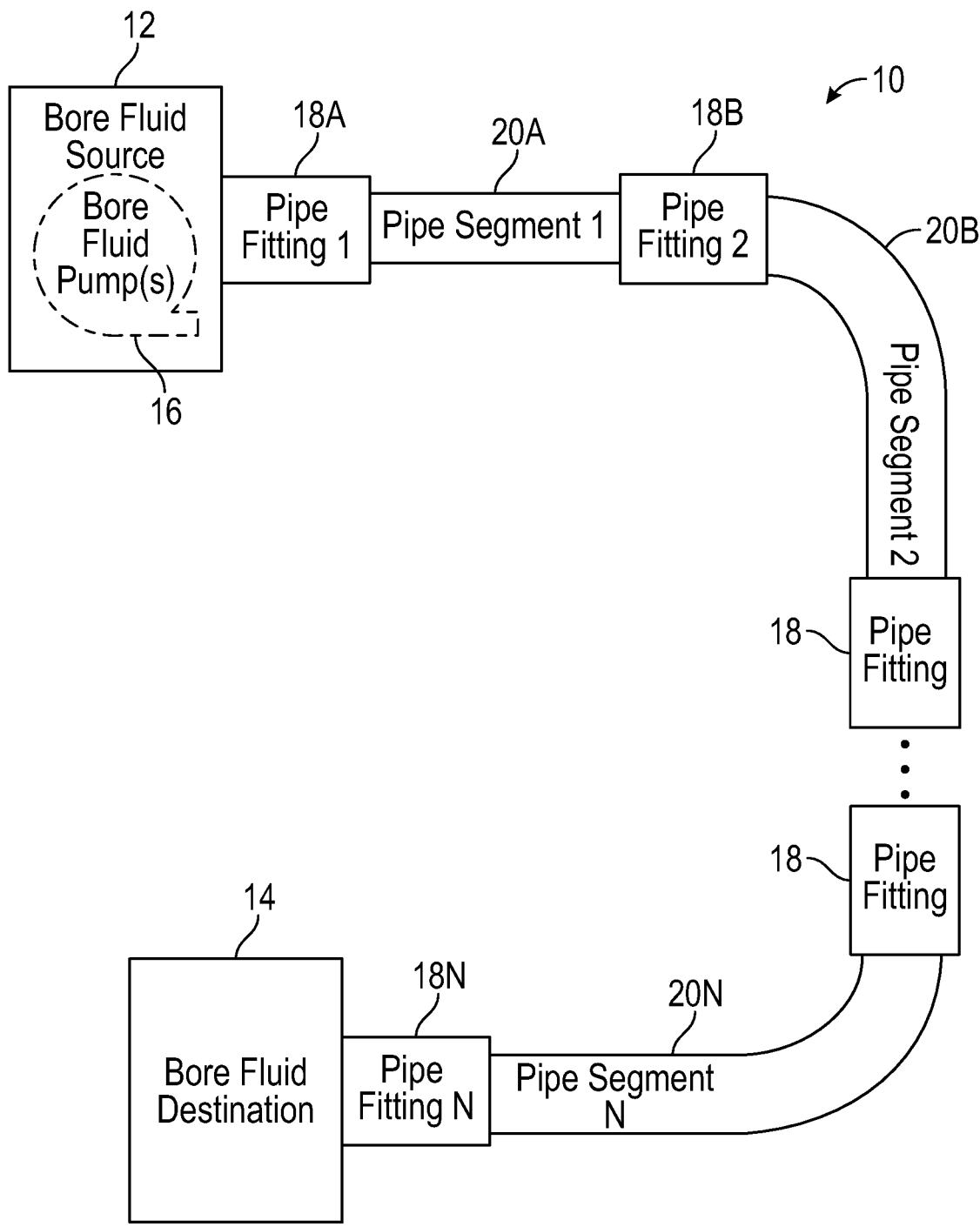
FIG. 1 is a block diagram of an example of a pipeline system including pipe segments and pipe fittings (e.g., connectors), in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings (e.g., connectors), such as a midline pipe fitting and/or a pipe end fitting, and one or more pipe segments, which each includes tubing that defines (e.g., encloses) a corresponding pipe bore. In particular, a pipe segment may generally be secured and sealed in one or more pipe fittings to facilitate fluidly coupling the pipe segment to another pipe segment, a fluid source, and/or a fluid destination. Merely as an illustrative non-limiting example, a pipeline system may include a first pipe end fitting that couples a first pipe segment to a fluid source, a midline pipe fitting that couples the first pipe segment to a second pipe segment, and a second pipe end fitting that couples the second pipe segment to a fluid destination.

Additionally, in some instances, a pipe deployment system may be implemented and/or operated to facilitate deploying one or more pipe segments in a pipeline system. In particular, in some such instances, a pipe segment to be deployed in the pipeline system may be loaded into a pipe deployment frame of the pipe deployment system. In other instances, a pipe segment to be deployed in the pipeline system may be loaded onto a pipe deployment trailer of the pipe deployment system, for example, which may be selectively moved (e.g., towed) by a tow vehicle, such as a truck.

To facilitate deploying a pipe segment via a pipe deployment system, in some instances, the pipe segment may be loaded into the pipe deployment system as one or more coils. In particular, in some such instances, the pipe segment may be wrapped (e.g., spooled and/or coiled) on a pipe drum that may be coupled to a pipe deployment trailer and/or a pipe deployment frame. In such instances, pulling on a free end of the pipe segment may cause the pipe drum to rotate and, thus, more of the pipe segment to be unwrapped from the pipe drum, thereby facilitating deployment of the pipe segment in a pipeline system.

To facilitate controlling pipe deployment speed, a pipe deployment system may include a brake assembly, which includes one or more brake pads and a brake wheel implemented proximate to the one or more brake pads. In particular, in some instances, the brake wheel may include a shaft socket, which is keyed to matingly interface with a corresponding keyed shaft to facilitate tying rotation of the brake wheel to rotation of the keyed shaft. For example, the shaft socket of the brake assembly may be keyed such that the brake shaft socket includes one or more flat inner surfaces. Thus, to facilitate tying its rotation to the rotation of the brake wheel, the pipe drum may include a drum shaft, which extends out from its drum body on which one or more pipe segments are wrapped (e.g., coiled) and is keyed with one or more corresponding flat outer surfaces.

In other instances, a pipe segment to be deployed in a pipeline system may be wrapped (e.g., spooled and/or coiled) on a pipe reel, which includes a first reel end, a second reel end, and a reel drum coupled between the first reel end and the second reel end. In particular, in such instances, one or more pipe segments may be wrapped on the reel drum and the reel ends may each include one or more reel spokes, which are implemented to facilitate containing the one or more pipe segments on the reel drum. However, in some such instances, a pipe reel may not include a reel shaft, for example, instead including shaft openings that enable a discrete (e.g., separate) shaft to be inserted through the reel ends and the reel drum of the pipe reel.

Moreover, in other instances, a pipe reel may include a reel shaft (e.g., axle) that extends from its first reel end to its second reel end, for example, through its reel drum. In other words, in such instances, the reel shaft may end at the reel ends and, thus, not extend out past the reel ends. As such, the lack of an extended reel shaft may limit the ability of a pipe deployment system to deploy a pipe segment directly from a pipe reel, which, at least in some instances, may limit the operational flexibility and/or operational efficiency of the pipe deployment system, for example, due to the pipe segment being transferred from the pipe reel to a pipe drum, which includes an extended drum shaft, before the pipe deployment system is able to deploy the pipe segment in a pipeline system.

Accordingly, to facilitate improving operational flexibility and/or operational efficiency of a pipe deployment system, the present disclosure provides techniques for implementing (e.g., manufacturing) and/or deploying (e.g., installing) a shaft adapter assembly, for example, at a pipe reel on which one or more pipe segments to be deployed in a pipeline system are wrapped (e.g., coiled and/or spooled). In particular, as will be described in more detail below, the shaft adapter assembly may be coupled to a pipe reel to facilitate interfacing the pipe reel with a brake assembly of a pipe deployment trailer and/or a pipe deployment frame in the pipe deployment system. In other words, implementing and/or deploying a shaft adapter assembly in accordance with the techniques described in the present disclosure may facilitate tying rotation of the pipe reel and, thus, deployment speed of a pipe segment wrapped on the pipe reel to rotation of a brake wheel in the brake assembly.

To facilitate tying rotation of a pipe reel to rotation of a brake assembly, a shaft adapter assembly may be coupled therebetween to facilitate tying rotation of the shaft adapter assembly to rotation of a brake wheel of the brake assembly as well as to rotation of the pipe reel. In particular, to facilitate tying rotation of the pipe reel with rotation of the brake assembly, the shaft adapter assembly may include adapter heads, which are each implemented to be partially inserted into a corresponding shaft opening in a pipe reel to facilitate implementing an adapter shaft that extends out beyond the reel ends of the pipe reel. For example, a first adapter head of the shaft adapter assembly may include a first adapter shaft that is implemented to be partially inserted into a first shaft opening on a first side of the pipe reel. Additionally, a second adapter head of the shaft adapter assembly may include a second adapter shaft that is implemented to be partially inserted into a second shaft opening on a second (e.g., opposite) side of the pipe reel.

Furthermore, to facilitate tying rotation of the shaft adapter assembly to rotation of the brake assembly, an (e.g., first) adapter head of the shaft adapter assembly may be keyed to matingly interlock (e.g., interface and/or engage) with a keyed shaft socket on the brake wheel of the brake assembly. As described above, in some embodiments, a shaft socket on a brake wheel may be keyed with one or more flat inner surfaces. Thus, in such embodiments, the adapter shaft of the adapter head may be keyed with one or more flat outer surfaces, which each correspond with a flat inner surface of the keyed shaft socket on the brake wheel.

Moreover, to facilitate tying rotation of the shaft adapter assembly and, thus, rotation of the brake assembly to rotation of the pipe reel, an (e.g., first) adapter head of the shaft adapter assembly may include a rotation control plate with one or more rotation control pins that are each implemented to be inserted through a corresponding reel end of the pipe reel, for example, between adjacent reel spokes in the reel end. Additionally, to facilitate properly loading a pipe reel onto a pipe deployment trailer, in some embodiments, one or more adapter heads of the shaft adapter assembly may each include an adapter guide plate, for example, which is implemented to interface (e.g., interlock) with a corresponding trailer guide plate on the pipe deployment trailer to facilitate properly aligning the shaft adapter assembly and, thus, the pipe reel with the pipe deployment trailer. Furthermore, to facilitate supporting the weight of a pipe reel and one or more pipe segments wrapped on the pipe reel, in some embodiments, a shaft adapter assembly may additionally or alternatively include a support shaft that is implemented to be coupled between its adapter heads. In this manner, as will be described in more detail below, the techniques described in the present disclosure may facilitate enabling a pipe segment to be deployed directly from a pipe reel that does not include an extended reel shaft, which, at least in some instances, may facilitate improving operational flexibility and/or operational efficiency of a pipe deployment system, for example, at least in part by obviating a transfer of the pipe segment from the pipe reel to a pipe drum that includes an extended drum shaft before the pipe deployment system can deploy the pipe segment in a pipeline system.

To help illustrate, an example of a pipeline system 10 is shown in FIG. 1. As in the depicted example, the pipeline system 10 may be coupled between a bore fluid source 12 and a bore fluid destination 14. Merely as an illustrative not limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer (e.g., one) pipe segments 20. Additionally or alternatively, in other embodiments, a pipeline system 10 may include fewer (e.g., two) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a pipe reel and/or a pipe drum (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both.

Figure 2:
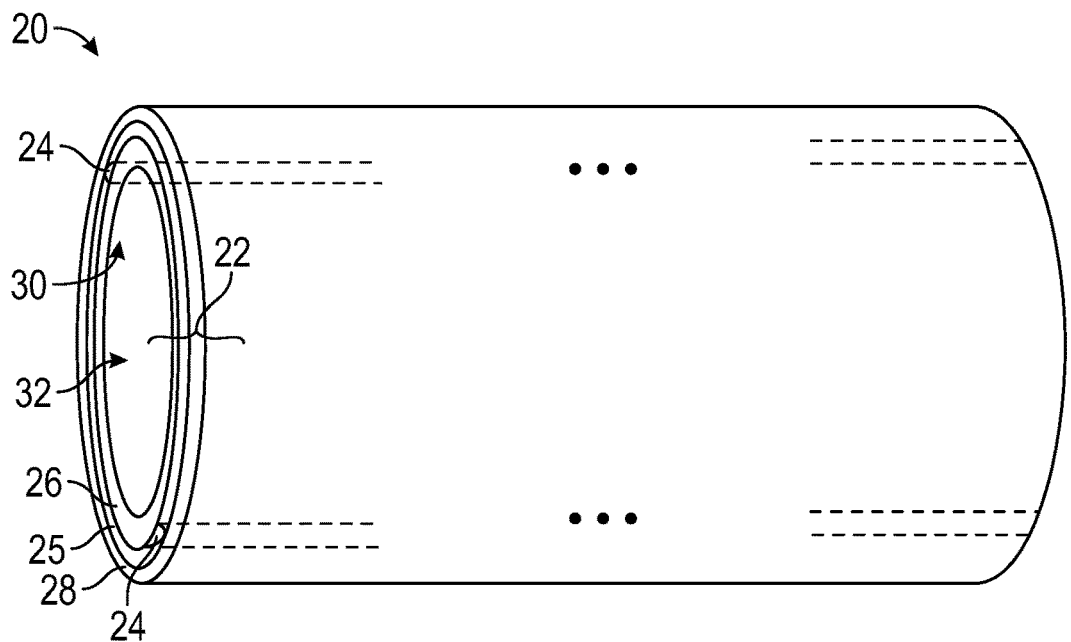
FIG. 2 is a side view of an example of a pipe segment of FIG. 1 that includes a bore defined by its tubing as well as fluid conduits implemented within an annulus of its tubing, in accordance with an embodiment of the present disclosure.

To help illustrate, an example of a pipe segment 20, which includes tubing 22 with fluid conduits 24 implemented in its annulus 25, is shown in FIG. 2. As depicted, the pipe segment tubing 22 is implemented with multiple layers including an inner (e.g., innermost) layer 26 and an outer (e.g., outermost) layer 28. In some embodiments, the inner layer 26 and/or the outer layer 28 of the pipe segment tubing 22 may be implemented using composite material and/or plastic, such as high-density polyethylene (HDPE) and/or raised temperature polyethylene (PE-RT). In any case, as depicted, an inner surface 30 of the inner layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner layer 26 and its outer layer 28. As will be described in more detail below, the tubing annulus 25 may include one or more intermediate layer of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, compared to solid pipe segment tubing 22 and/or pipe segment tubing 22 that does not include fluid conduits 24 implemented therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, pipe segment tubing 22 may include fewer (e.g., one) or more (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the axial (e.g., longitudinal) extent of the pipe bore 32.

Figure 3:
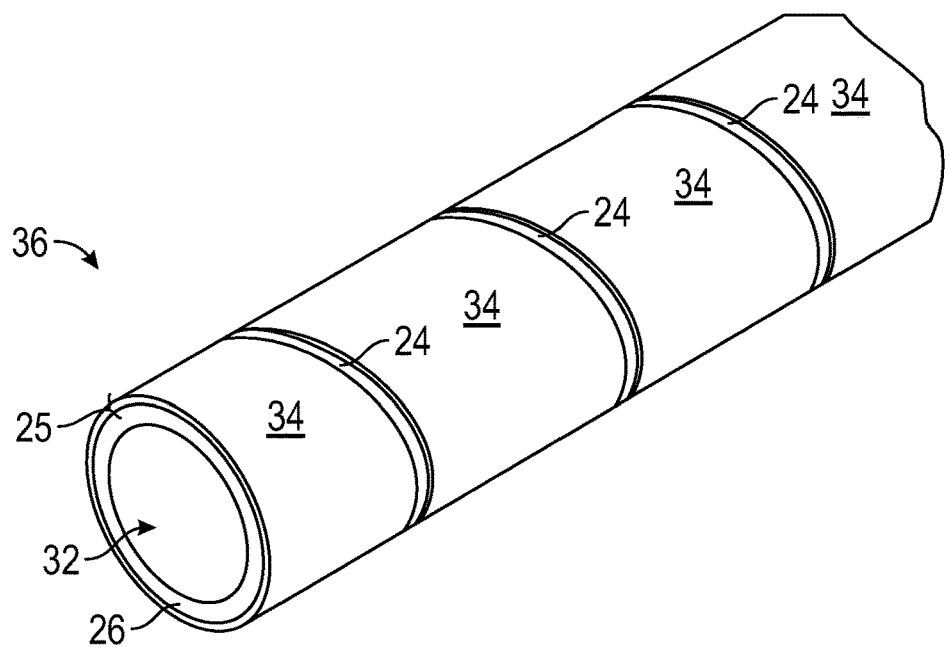
FIG. 3 is a perspective view of an example of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner layer 26 and an intermediate layer 34 included in the annulus 25 of its pipe segment tubing 22, is shown in FIG. 3. In some embodiments, one or more intermediate layers 34 of pipe segment tubing 22 may be implemented at least in part using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive, which, at least in some instances, may enable communication of electrical (e.g., control and/or sensor) signals via the intermediate layer 34.

In any case, as depicted, the intermediate layer 34 is helically disposed (e.g., wound and/or wrapped) on the inner layer 26 such that gaps (e.g., openings) are left between adjacent windings to define a fluid conduit 24. In other words, in some embodiments, the intermediate layer 34 may be implemented at least in part by winding a metal (e.g., steel) strip around the inner layer 26 at a non-zero lay angle (e.g., fifty-four degrees) relative to the axial (e.g., longitudinal) extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer layer 28 may be disposed directly over the depicted intermediate layer 34 and, thus, cover and/or define (e.g., enclose) the depicted fluid conduit 24. However, in other embodiments, the tubing annulus 25 of pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer layer 28 may be disposed over the third other intermediate layer 34 and, thus, cover (e.g., define and/or enclose) the other fluid conduit 24 in the third other intermediate layer 34. In any case, as described above, in some embodiments, one or more pipe segments 20 may be deployed in a pipeline system 10 using a pipe deployment system.

Figure 4:
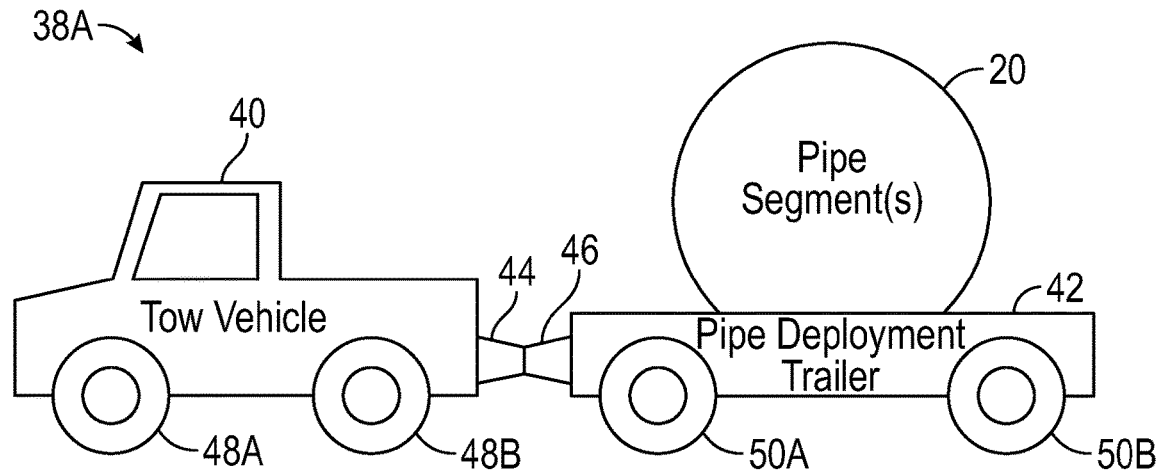
FIG. 4 is block diagram of an example of a pipe deployment system that includes a pipe deployment trailer, in accordance with an embodiment of the present disclosure.

To help illustrate, an example of a pipe deployment system 38A is shown in FIG. 4. As depicted, the pipe deployment system 38A includes a tow vehicle 40 and a pipe deployment trailer 42 on which one or more pipe segments 20 are loaded. In particular, as depicted, the tow vehicle 40 and the pipe deployment trailer 42 are coupled together via a hitch assembly 44 on the tow vehicle 40 and a tongue assembly 46 on the pipe deployment trailer 42.

Additionally, as in the depicted example, a tow vehicle 40 may include one or more vehicle wheels 48. In particular, in the depicted example, the tow vehicle 40 includes a first vehicle wheel 48A and a second vehicle wheel 48B. However, it should be appreciated that the depicted example is merely intended to be illustrative and not limiting. For example, the tow vehicle 40 may additionally include a third vehicle wheel 48 opposite the first vehicle wheel 48A and a fourth vehicle wheel 48 opposite the second vehicle wheel 48B. Additionally or alternatively, in other embodiments, one or more vehicle wheels 48 may instead be implemented as part of a vehicle track assembly.

Furthermore, as in the depicted example, a pipe deployment trailer 42 may include one or more trailer wheels 50. In particular, in the depicted example, the pipe deployment trailer 48 includes a first trailer wheel 50A and a second trailer wheel 50B. However, it should again be appreciated that the depicted example is merely intended to be illustrative and not limiting. For example, the pipe deployment trailer 42 may additionally include a third trailer wheel 50 opposite the first trailer wheel 50A and a fourth trailer wheel 50 opposite the second trailer wheel 50B.

Figure 5:
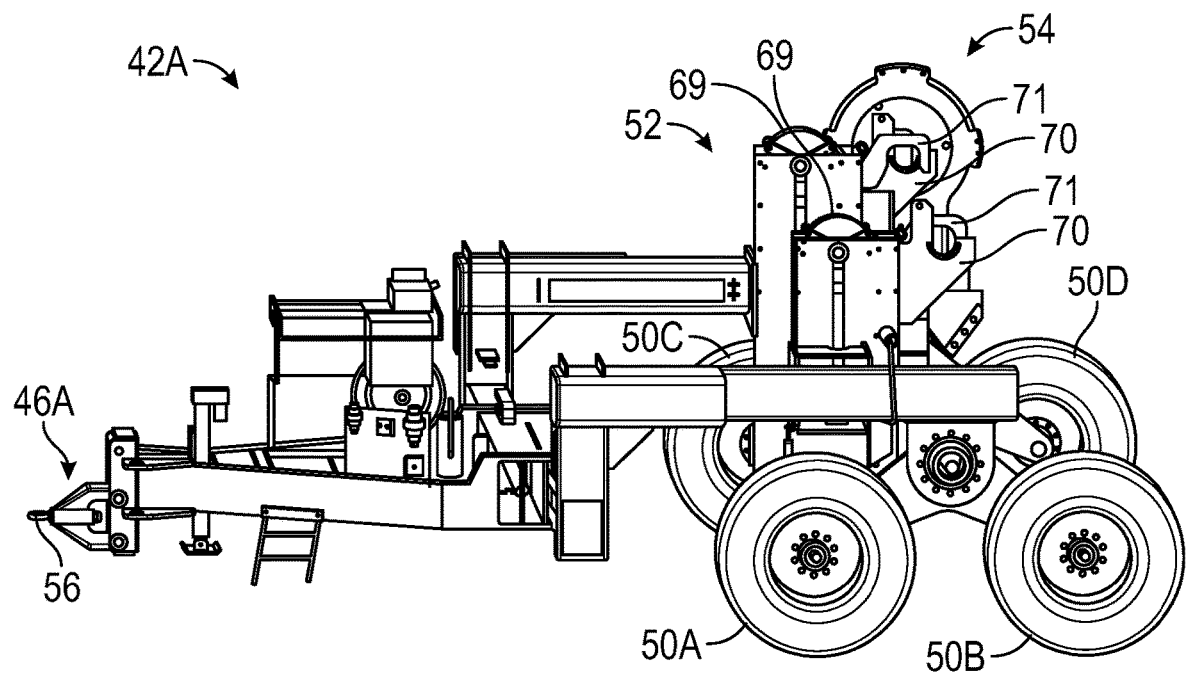
FIG. 5 is a side perspective view of an example of the pipe deployment trailer of FIG. 4 that includes a brake assembly, in accordance with an embodiment of the present disclosure.

To help further illustrate, an example of a pipe deployment trailer 42A, which may be used in a pipe deployment system 38, is shown in FIG. 5. As depicted, the pipe deployment trailer 42A includes a lifting assembly 52, a tongue assembly 46A, a first trailer wheel 50A, a second trailer wheel 50B, a third trailer wheel 50C, and a fourth trailer wheel 50D. In particular, as depicted, the tongue assembly 46 includes a trailer coupler 56, which is implemented to be coupled to a trailer hitch in a corresponding hitch assembly 44. Additionally, as depicted, the pipe deployment trailer 42A includes a braking assembly 54, which may be implemented and/or operated to facilitate controlling pipe deployment speed of the pipe deployment trailer 42A.

Figure 6:
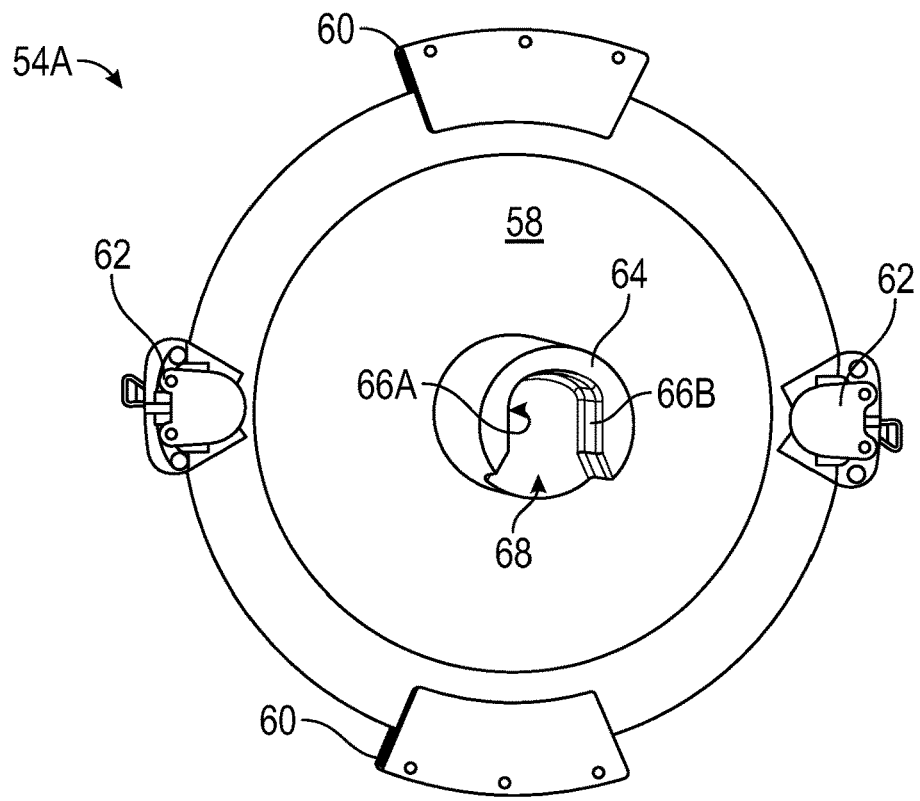
FIG. 6 is a side perspective view of an example of the brake assembly of FIG. 5, in accordance with an embodiment of the present disclosure.

To help illustrate, an example of a brake assembly 54A, which may be deployed in a pipe deployment system 38, is shown in FIG. 6. As in the depicted example, a braking assembly 54 may include a brake wheel 58, one or more brake wheel guide plates 60 implemented proximate to the brake wheel 58, and one or more brake pads 62 implemented proximate to the brake wheel 58. In other words, in some embodiments, the one or more brake pads 62 may be implemented and/or operated to selectively engage the brake wheel 58 and, thus, resist (e.g., slow) rotation of the brake wheel 58.

Additionally, as depicted, the brake wheel 58 includes a shaft socket 64, which is implemented to matingly interlock (e.g., interface) with a shaft (e.g., axle). In particular, to facilitate matingly interfacing with a shaft, the shaft socket 64 may be keyed with one or more flat inner surfaces 66. For example, the shaft socket 64 may be keyed with a first flat inner surface 66A and a second flat inner surface 66B. Furthermore, as in the depicted example, in some embodiments, the shaft socket 64 may include a shaft insertion opening 68, which is implemented to enable a shaft to be inserted into the shaft socket 64.

However, it should be appreciated that the depicted example is merely intended to be illustrative and not limiting. In particular, in other embodiments, a brake assembly 54 in a pipe deployment system 38 may include less than two (e.g., one) brake pads 62 or more than two brake pads 62. Additionally or alternatively, in other embodiments, a brake assembly 54 in a pipe deployment system 38 may include less than two (e.g., zero or one) brake wheel guide plates 60 or more than two brake wheel guide plates 60. Furthermore, in other embodiments, a shaft socket 64 of a brake assembly 54 may additionally or alternatively be keyed with a single flat inner surface 66 or more than two flat inner surfaces 66.

Returning to the example pipe deployment trailer 42A of FIG. 5, in some embodiments, the lifting assembly 52 of the pipe deployment trailer 42A may be operated to facilitate matingly interfacing (e.g., engaging) a shaft with a shaft socket 64 in the brake assembly 54. In particular, as in the depicted example, the lifting assembly 52 may include one or more actuators (e.g., pullies) 69, which are each implemented and/or operated to selectively raise (e.g., lift) a corresponding lifting hook 70 and, thus, a shaft loaded on the lifting hook 70 until a corresponding vertical stop 71 is reached and/or to selectively lower (e.g., drop) the lifting hook 70 and, thus, the shaft loaded on the lifting hook 70 from the vertical stop 71. In other words, in some such embodiments, the lifting assembly 52 may be operated to selectively raise a keyed shaft such that the keyed shaft is slid through a shaft insertion opening 68 into the shaft socket 64 of the brake assembly 54.

However, it should be appreciated that the depicted example is merely intended to be illustrative and not limiting. In particular, in other embodiments, a pipe deployment trailer 42 may not include a lifting assembly 52, for example, when the pipe deployment trailer 42 is implemented such that a pipe reel is loaded at least in part by selectively contracting the pipe deployment trailer 42 around the pipe reel. Additionally, in other embodiments, a pipe deployment system 38 may not include a pipe deployment trailer 42, for example, when the pipe deployment system 38 instead includes a pipe deployment frame.

Figure 7:
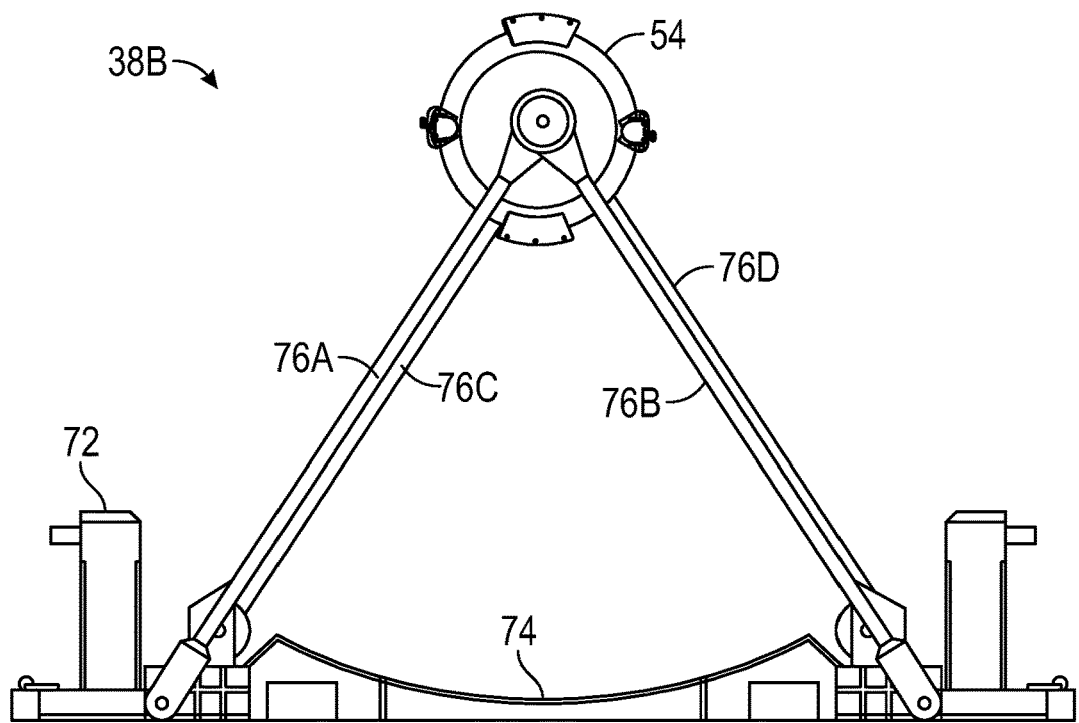
FIG. 7 is a side view of another example of a pipe deployment system that includes a pipe deployment frame with a brake assembly, in accordance with an embodiment of the present disclosure.

To help illustrate, an example of a pipe deployment system 38B, which includes a pipe deployment frame 72, is shown in FIG. 7. As depicted, the pipe deployment frame 72 includes a frame base 74 on which one or more pipe segments 20 may be loaded. Additionally, as depicted, the pipe deployment frame 72 includes support arms 76—namely a first support arm 76A, a second support arm 76B, a third support arm 76C, and a fourth support arm 76D. In particular, as in the depicted example, a brake assembly 54 of the pipe deployment system 38B may be coupled to the frame base 74 via one or more of the support arms 76.

In any case, as described above, a pipe segment 20 to be deployed in a pipeline system 10 may be loaded in a pipe deployment system 38. In particular, the pipe segment 20 may be loaded into a pipe deployment frame 72 or onto a pipe deployment trailer 42 as one or more coils. For example, the pipe segment 20 may be wrapped (e.g., coiled and/or spooled) on a pipe drum.

Figure 8:
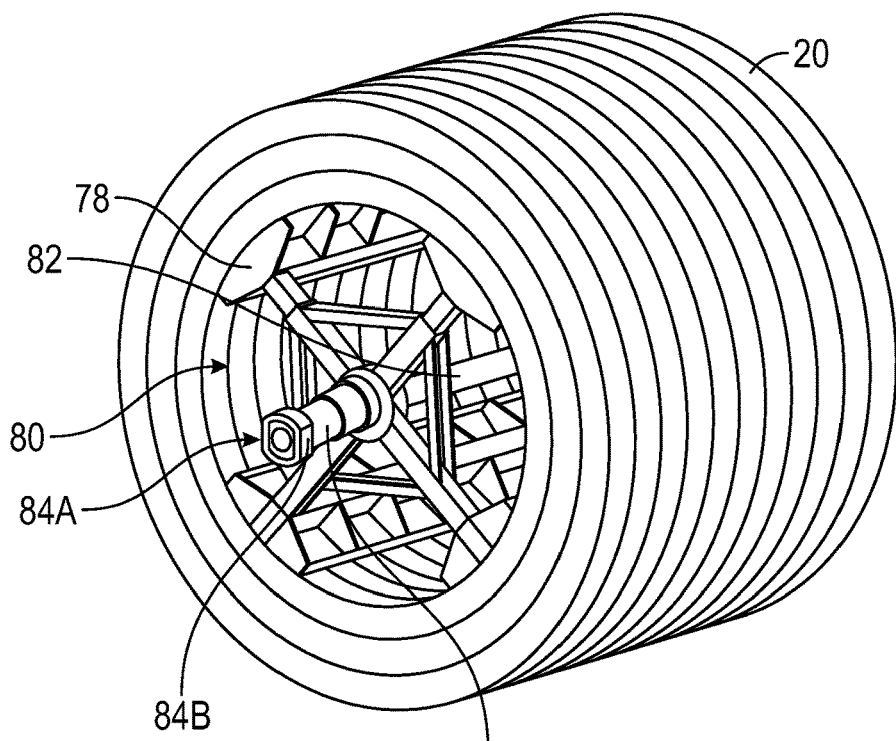
FIG. 8 in a side perspective view of an example of a pipe segment wrapped (e.g., coiled and/or spooled) on a pipe drum, in accordance with an embodiment of the present disclosure.

To help illustrate, an example of a pipe segment 20 disposed on a pipe drum 78 is shown in FIG. 8. In some embodiments, the pipe segment 20 may be coiled at least in part by wrapping the pipe segment 20 directly on the pipe drum 78. In other embodiments, the pipe segment 20 may be coiled before the pipe drum 78 is inserted into and expanded within a resulting coil eye 80.

In any case, as depicted, the pipe drum 78 includes a drum shaft 82 that extends out from its drum body on which the pipe segment 20 is wrapped. In particular, to facilitate tying rotation of the pipe drum 78 and, thus, rotation of the pipe segment 20 wrapped on the pipe drum 78 to rotation of a brake assembly 54, the drum shaft 82 may be keyed to matingly interlock (e.g., interface) with a shaft socket 64 in the brake assembly 54. As described above, in some embodiments, the shaft socket 64 of a brake assembly 54 may be keyed with one or more flat inner surfaces 66. Thus, to facilitate matingly interfacing the pipe drum 78 with the shaft socket 64, the drum shaft 82 may be keyed with one or more corresponding flat outer surfaces 84. For example, the drum shaft 82 may be keyed with a first flat outer surface 84A, which is implemented to be aligned with a first flat inner surface 66A of the shaft socket 64, and a second flat outer surface 84B, which is implemented to be aligned with a second flat inner surface 66B of the shaft socket 64.

However, it should be appreciated that the depicted example is merely intended to be illustrative and not limiting. In particular, in other embodiments, a drum shaft 82 of a pipe drum 78 may be keyed with a single flat outer surface 84 or more than two flat outer surfaces 84. Additionally, as described above, in other embodiments, a pipe segment 20 to be deployed in a pipeline system 10 may be wrapped (e.g., coiled and/or spooled) on a pipe reel.

Figure 9:
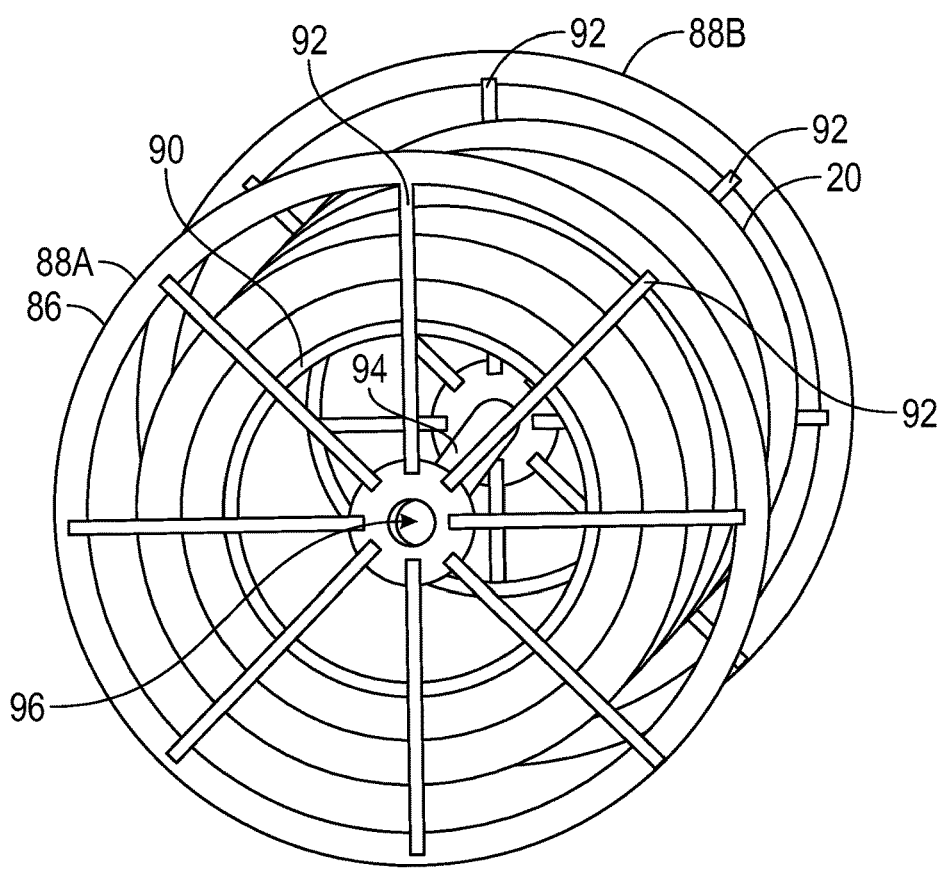
FIG. 9 is a side perspective view of an example of a pipe segment wrapped on a pipe reel, in accordance with an embodiment of the present disclosure.

To help illustrate, an example of a pipe segment 20 disposed on a pipe reel 86 is shown in FIG. 9. As depicted, the pipe reel 86 includes a first reel end 88A, a second reel end 88B, and a reel drum 90, which is coupled between the first reel end 88A and the second reel end 88B. In particular, as depicted, the reel ends 88 each include one or more reel spokes 92 implemented to facilitate containing the pipe segment 20 on the reel drum 90.

Additionally, as in the depicted example, in some embodiments, the pipe reel 86 may include a reel shaft 94 that extends from the first reel end 88A to the second reel end 88B. In other words, the reel shaft 94 of the pipe reel 86 ends at the reel ends 88 and, thus, does not extend out past the coils of the pipe segment 20. Furthermore, as in the depicted example, in some embodiments, the reel shaft 94 may be hollow and, thus, the reel ends 88 may each include a corresponding shaft opening 96.

However, it should be appreciated that the depicted example is merely intended to be illustrative and not limiting. In particular, in other embodiments, a pipe reel 86 may not include an integrated reel shaft 94. In such embodiments, the pipe reel 86 may instead merely include shaft openings 96, which are implemented to enable a discrete (e.g., separate) reel shaft 94 to be inserted therethrough.

In any case, as described above, in some embodiments, a brake assembly 54 of a pipe deployment system 38 may include a shaft socket 64, which is implemented to matingly interlock (e.g., interface) with a keyed shaft. In other words, in such embodiments, the lack of a reel shaft 94 that extends out past its reel ends 88 may limit the ability of a pipe reel 86 to directly interlock with the brake assembly 54 and, thus, the ability of the pipe deployment system 38 to deploy a pipe segment 20 directly from the pipe reel 86. To facilitate interfacing the pipe reel 86 with the brake assembly 54, a shaft adapter assembly may be coupled therebetween.

Figure 10:
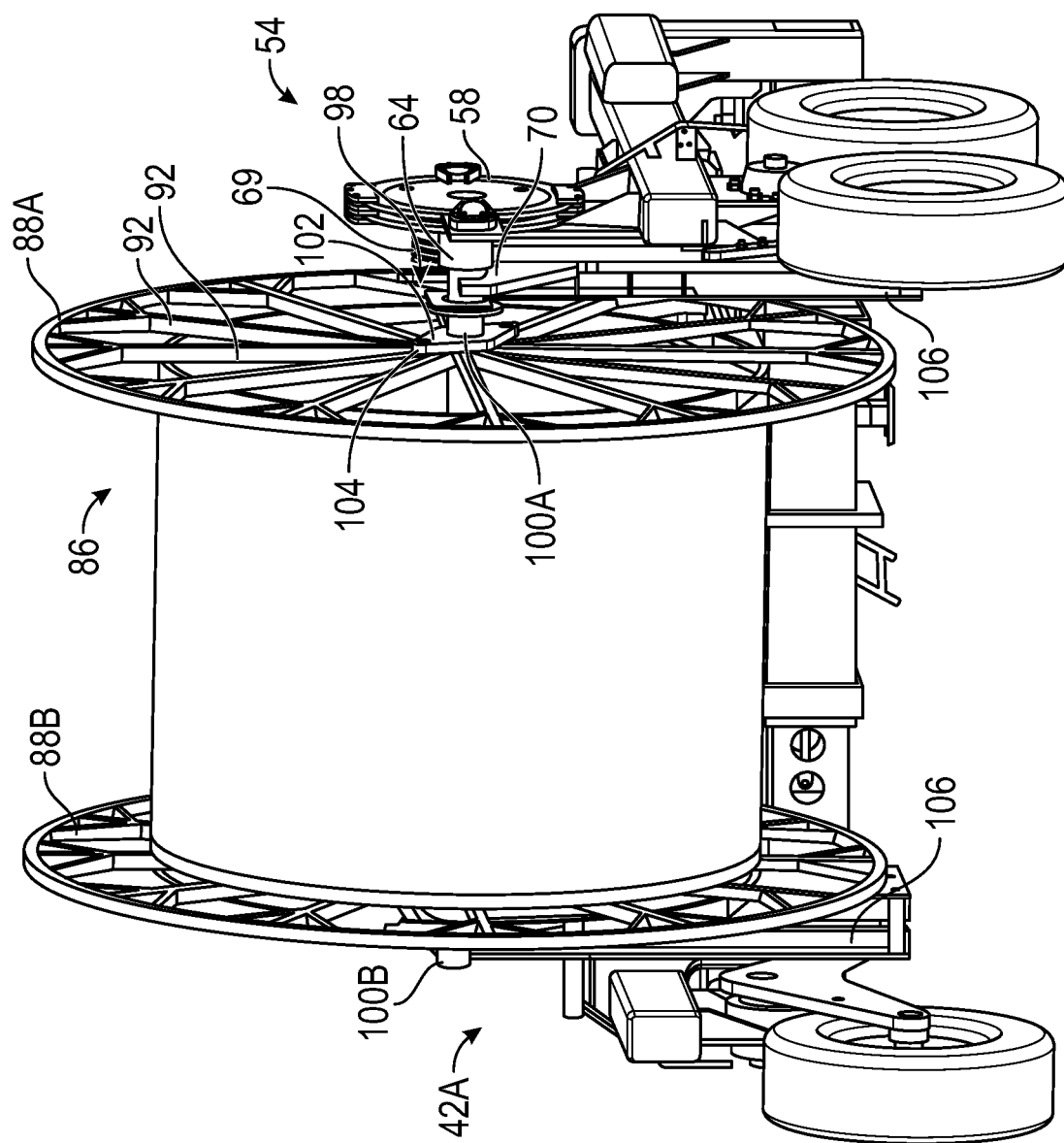
FIG. 10 is a back perspective view of the pipe reel of FIG. 9 coupled to the pipe deployment trailer of FIG. 5 via a shaft adapter assembly, in accordance with an embodiment of the present disclosure.

To help illustrate, an example of a pipe reel 86 coupled to the brake assembly 54 of a pipe deployment trailer 42A via a shaft adapter assembly 98 is shown in FIG. 10. As depicted, the shaft adapter assembly 98 includes a first adapter head 100A, which is inserted through a first reel end 88A of the pipe reel 86, and a second adapter head 100B, which is inserted through a second reel end 88B of the pipe reel 86. In particular, as depicted, the first adapter head 100A includes a rotation control plate 102 with one or more rotation control pins 104, which are inserted between adjacent reel spokes 92 in the first reel end 88A to facilitate tying rotation of the pipe reel 86 to rotation of the shaft adapter assembly 98. To facilitate tying rotation of the shaft adapter assembly 98 and, thus, rotation of the pipe reel 86 to rotation of the brake assembly 54, as depicted, the first adapter head 100A is also coupled to a shaft socket 64 on the brake wheel 58 of the brake assembly 54.

At least in some instances, a pipe reel 86 may rest on the ground before being loaded into a pipe deployment system 38. Thus, to facilitate loading the pipe reel 86 onto the pipe deployment trailer 42A in such instances, the pipe deployment trailer 42A may be moved (e.g., backed up) to the pipe reel 86. When properly aligned, one or more actuators 69 on the pipe deployment trailer 42A may be operated to raise corresponding lifting hooks 70 such that a shaft adapter assembly 98 installed on the pipe reel 86 is raised to the height of the shaft socket 64 in the brake assembly 54. To facilitate properly aligning the shaft adapter assembly 98, in some embodiments, the pipe deployment trailer 42A may include one or more trailer guide plates 106. Additionally, in some such embodiments, one or more adapter heads 100 of the shaft adapter assembly 98 may include an adapter guide plate, which is implemented to interface (e.g., abut) with a corresponding trailer guide plate 106.

Figure 11:
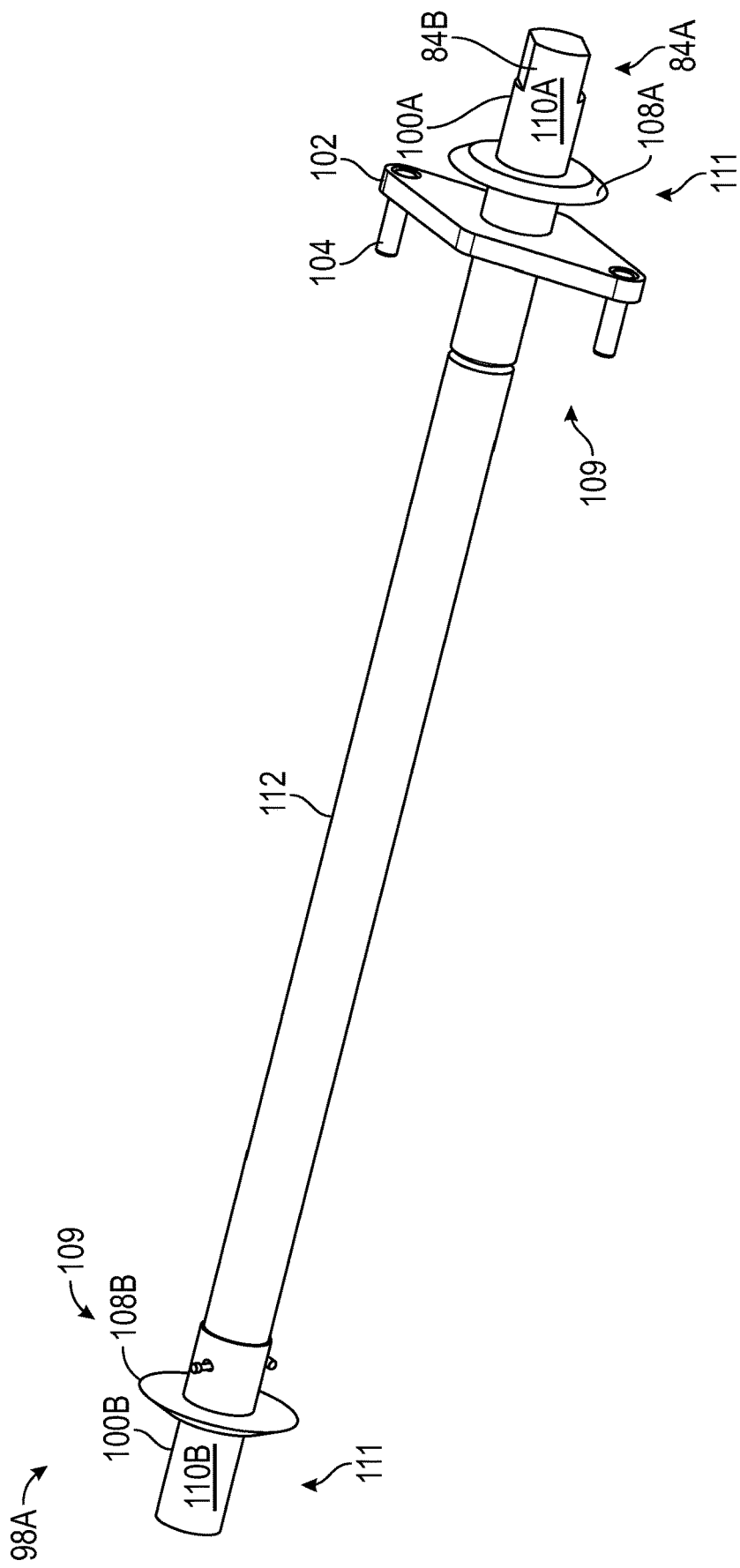
FIG. 11 is a perspective view of an example of the shaft adapter assembly of FIG. 10, in accordance with an embodiment of the present disclosure.

To help illustrate, an example of a shaft adapter assembly 98A is shown in FIG. 11. As depicted, the shaft adapter assembly 98A includes a first adapter head 100A and a second adapter head 100B. In particular, the first adapter head 100A includes a first adapter shaft 110A and a first adapter guide plate 108A, which is coupled between an inner end 109 of the first adapter shaft 110A and an outer end 111 of the first adapter shaft 110A. Similarly, the second adapter head 100B includes a second adapter shaft 110B and a second adapter guide plate 108B, which is coupled between an inner end 109 of the second adapter shaft 110B and an outer end 111 of the second adapter shaft 110B.

Generally, the inner end 109 of each adapter shaft 110 is implemented to be inserted through a corresponding reel end 88 of a pipe reel 86 to facilitate supporting the weight of the pipe reel 86 and one or more pipe segments 20 wrapped on the pipe reel 86. For example, the inner end 109 of the second adapter shaft 110B may be implemented to be inserted through a shaft opening 96 in a second reel end 88B of the pipe reel 86. Similarly, the inner end 109 of the first adapter shaft 110A may be implemented to be inserted through a shaft opening in a first reel end 88A of the pipe reel 86. On the other hand, the outer end 111 of the first adapter shaft 110A may be implemented to matingly interlock (e.g., interface) with the shaft socket 64 of a brake assembly 54.

In addition to the first adapter guide plate 108A, as depicted, the first adapter head 100A includes a rotation control plate 102 coupled (e.g., welded) to the first adapter shaft 110A. In particular, rotation control pins 104 are coupled (e.g., welded) to the rotation control plate 102 such that they extend inwardly from the rotation control plate 102. In other words, as described above, the rotation control pins 104 may each be implemented to be inserted between adjacent reel spokes 92 to facilitate tying rotation of a corresponding pipe reel 86 to rotation of the shaft adapter assembly 98A.

Additionally, as in the depicted example, the shaft adapter assembly 98A may include a support shaft 112 coupled between the first adapter head 100A and the second adapter head 100B, for example, to facilitate supporting the weight of the pipe reel 86 and the weight of one or more pipe segments 20 wrapped on the pipe reel 86. In some embodiments, the support shaft 112 and an adapter head 100 may be matingly threaded and, thus, the adapter head 100 may be secured to the support shaft 112 at least in part by screwing the adapter head 100 onto the support shaft. Additionally or alternatively, an adapter head 100 may be secured to the support shaft 112 at least in part by inserting and securing a fastener, such as a pin or a bolt, in an opening in the adapter head 100 as well as a corresponding opening in the support shaft 112.

However, it should be appreciated that the depicted example is merely intended to be illustrative and not limiting. In particular, in other embodiments, a shaft adapter assembly 98 may not include a support shaft 112. Additionally or alternatively, in other embodiments, implementation of the second adapter head 100B may generally match implementation of the first adapter head 100A.

In any case, as described above, in some embodiments, the shaft socket 64 of a brake assembly 54 may be keyed with one or more flat inner surfaces 66. Thus, to facilitate matingly interfacing the shaft adapter assembly 98 with the shaft socket 64, the outer end 111 of an adapter shaft 110 may be keyed with one or more corresponding flat outer surfaces 84. For example, the first adapter shaft 110A of the first adapter head 100A may be keyed with a first flat outer surface 84A, which is implemented to be aligned with a first flat inner surface 66A of the shaft socket 64, and a second flat outer surface 84B, which is implemented to be aligned with a second flat inner surface 66B of the shaft socket 64. In this manner, a shaft adapter assembly that facilitates interfacing a pipe reel 86 with a brake assembly 54 of a pipe deployment system 38 may be implemented.

Figure 12:
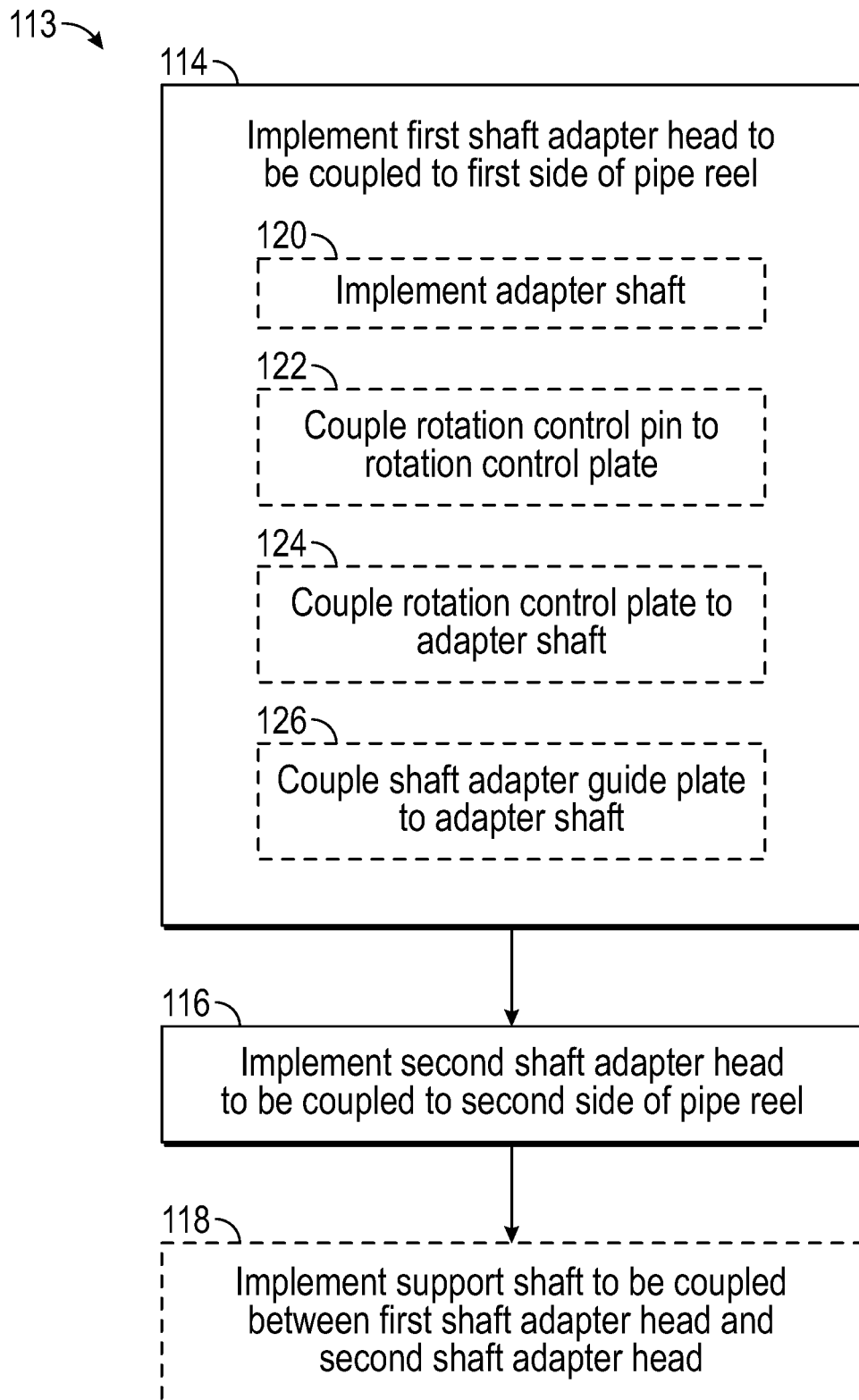
FIG. 12 is a flow diagram of an example process for implementing the shaft adapter assembly of FIG. 10, in accordance with an embodiment of the present disclosure.

To help further illustrate, an example of a process 113 for implementing (e.g., manufacturing) a shaft adapter assembly 98 is described in FIG. 12. Generally, the process 113 includes implementing a first adapter head to be coupled to a first side of a pipe reel (process block 114). Additionally, the process 113 generally includes implementing a second adapter head to be coupled to a second side of the pipe reel (process block 116).

Although described in a specific order, which corresponds with an embodiment of the present disclosure, it should be appreciated that the example process 113 is merely intended to be illustrative and not limiting. In particular, in other embodiments, a process 113 for implementing a shaft adapter assembly 98 may include one or more additional process blocks and/or omit one or more of the depicted process blocks. For example, some embodiments of the process 113 may additionally include implementing a support shaft to be coupled between the first adapter head and the second adapter head (process block 118) while other embodiments of the process 113 do not.

In any case, as described above, a shaft adapter assembly 98 may include a first adapter head 100A that is implemented to be coupled to a first side of a pipe reel 86, for example, at least in part by inserting a portion of the first adapter head 100A through a first reel end 88A of the pipe reel 86. Thus, implementing the shaft adapter assembly 98 may include implementing a first adapter head 100A to be coupled to the first side of the pipe reel 86 (process block 114). Additionally, as described above, in some embodiments, an adapter head 100 of a shaft adapter assembly 98 may include an adapter shaft 110. Thus, in such embodiments, implementing the first adapter head 100A may include implementing an adapter shaft 110 (process block 120). More specifically, in some embodiments, the first adapter head 100 may be implemented at least in part by milling its adapter shaft 110 from a block of material, such as metal. Additionally or alternatively, the adapter shaft 110 may be implemented at least in part by deforming (e.g., bending and/or molding) material, such as metal or plastic.

Moreover, as described above, in some embodiments, the adapter shaft 110 of the first adapter head 100A may be implemented to matingly interlock (e.g., interface) with a shaft socket 64 of a brake assembly 54, which is keyed with one or more flat inner surfaces 66. Thus, in such embodiments, implementing the adapter shaft 110 may include keying the adapter shaft 110 with one or more flat outer surfaces 84. In some embodiments, the one or more flat outer surfaces 84 may be implemented during initial manufacture of the adapter shaft 110. However, in other embodiments, the one or more flat outer surfaces 84 may be implemented after initial manufacture of the adapter shaft 110, for example, at least in part by selectively shaving down a portion of a rounded outer surface.

Additionally, as described above, in some embodiments, rotation of a pipe reel 86 may be tied to rotation of the shaft adapter assembly 98 via one or more rotation control pins 104, which extend inwardly from a rotation control plate 102 coupled to the adapter shaft 110 of the first adapter head 100A. Thus, in some such embodiments, implementing the first adapter head 100A may include coupling (e.g., welding) one or more rotation control pins 104 to a rotation control plate 102 (process block 122) and coupling (e.g., welding) the rotation control plate 102 to the adapter shaft 110 of the first adapter head 100A (process block 124). In other such embodiments, the one or more rotation control pins 104 and the rotation control plate 102 may be integrated with the adapter shaft 110 of the first adapter head 100A during initial manufacture, for example, at least in part by milling the one or more rotation control pins 104, the rotation control plate 102, and the adapter shaft 110 from a block of material, such as metal, as a unit.

Moreover, as described above, in some embodiments, the first adapter head 100A may include an adapter guide plate 108 coupled to its adapter shaft 110, for example, to facilitate properly aligning the shaft adapter assembly 98 and, thus, a corresponding pipe reel 86 with a pipe deployment trailer 42. Accordingly, in some such embodiments, implementing the first adapter head 100A may include coupling (e.g., welding) an adapter guide plate 108 to the adapter shaft 110 of the first adapter head 100A (process block 126). In other such embodiments, the adapter guide plate 108 may be integrated with the adapter shaft 110 of the first adapter head 100A during initial manufacture, for example, at least in part by milling the adapter guide plate 108 and the adapter shaft 110 from a block of material, such as metal, as a unit.

In any case, as described above, a shaft adapter assembly 98 may additionally include a second adapter head 100B that is implemented to be coupled to a second (e.g., opposite) side of the pipe reel 86, for example, at least in part by inserting a portion of the second adapter head 100B through a second reel end 88B of the pipe reel 86. In other words, implementing the shaft adapter assembly 98 may include implementing a second adapter head 100B to be coupled to the second side of the pipe reel 86 (process block 116). As described above, in some embodiments, the second adapter head 100B of a shaft adapter assembly 98 may generally match the first adapter head 100A of the shaft adapter assembly 98. Thus, in such embodiments, the second adapter head 100B may generally be implemented in the same manner as the first adapter head 100.

However, as described above, in other embodiments, the second adapter head 100B of a shaft adapter assembly 98 may differ from the first adapter head 100A of the shaft adapter assembly 98. For example, in some such embodiments, the second adapter head 100B may include an adapter guide plate 108 coupled to its adapter shaft 110, but not a rotation control plate 102 or a rotation control pin 104. Thus, in such embodiments, implementing the second adapter head 100B may include implementing an adapter shaft 110 and coupling an adapter guide plate 108 to the adapter shaft 110, but not include coupling a rotation control pin 104 to a rotation control plate 102 or coupling the rotation control plate 102 to the adapter shaft 110 of the second adapter head 100B.

Moreover, as described above, in some embodiments, the shaft adapter assembly 98 may include a support shaft 112 that is implemented to be coupled between the first adapter head 100A and the second adapter head 100B of the shaft adapter assembly 98. Thus, in such embodiments, implementing the shaft adapter assembly 98 may include implementing a support shaft 112 to be coupled between the first adapter head 100A and the second adapter head 100B (process block 118). More specifically, in some embodiments, the support shaft 112 may be implemented at least in part by milling the support shaft 112 from a block of material, such as metal. Additionally or alternatively, the support shaft 112 may be implemented at least in part by deforming (e.g., bending and/or molding) material, such as metal or plastic. In fact, in some embodiments, the support shaft 112 may be hollow to facilitate reducing the weight of the shaft adapter assembly 98, which, at least in some instances, may facilitate improving the ease with which the shaft adapter assembly 98 can be deployed (e.g., installed) at a pipe reel 86 and, thus, deployment efficiency of the shaft adapter assembly 98.

In any case, as described above, when a support shaft 112 is included, the adapter heads 100 of the shaft adapter assembly 98 may each be secured to the support shaft 112. In particular, in some embodiments, an adapter head 100 may be secured to the support shaft 112 at least in part by screwing the adapter head 100 onto the support shaft 112. Thus, in such embodiments, implementing the support shaft 112 may include implementing threading on the support shaft 112. In other embodiments, an adapter head 100 may be secured to the support shaft 112 at least in part by inserting and securing a fastener, such as a pin or a bolt, in an opening in the adapter head 100 as well as a corresponding opening in the support shaft 112. Thus, in such embodiments, implementing the support shaft 112 may include implementing a fastener opening in the support shaft 112. By implementing a shaft adapter assembly 98 in this manner, the shaft adapter assembly 98 may then be deployed (e.g., installed) at a pipe reel 86 to facilitate enabling a pipe deployment system 38 to deploy one or more pipe segments 20 wrapped on the pipe reel 86 in a pipeline system 10 directly from the pipe reel 86, which, at least in some instances, may facilitate improving operational flexibility and/or operational efficiency of the pipe deployment system 38, for example, at least in part by obviating a transfer of the one or more pipe segment 20 from the pipe reel 86 to a pipe drum 78 that includes an extended drum shaft 82.

Figure 13:
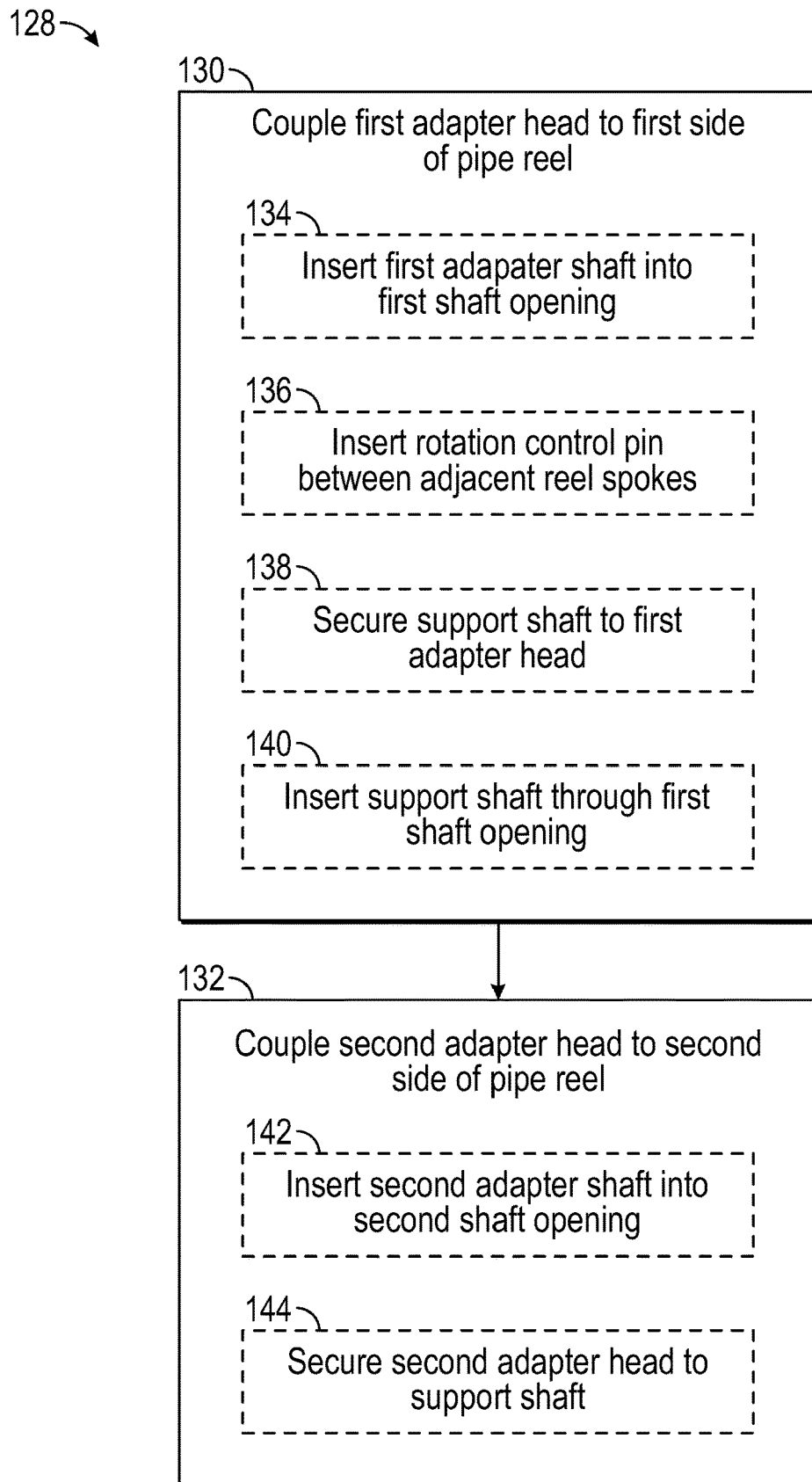
FIG. 13 is a flow diagram of an example process for deploying the shaft adapter assembly of FIG. 10 at a pipe reel, in accordance with an embodiment of the present disclosure.

To help illustrate, an example process 128 for deploying (e.g., installing) a shaft adapter assembly 98 at a pipe reel 86 is described in FIG. 13. Generally, the process 128 includes coupling a first adapter head to a first side of a pipe reel (process block 130) and coupling a second adapter head to a second side of the pipe reel (process block 132). Although described in a specific order, which corresponds with an embodiment of the present disclosure, it should be appreciated that the example process 128 is merely intended to be illustrative and not limiting. In particular, in other embodiments, a process 128 for deploying a shaft adapter assembly 98 at a pipe reel 86 may include one or more additional process blocks and/or omit one or more of the depicted process blocks.

In any case, as described above, a shaft adapter assembly 98 may include a first adapter head 100A that is implemented to be coupled to a first side of a pipe reel 86. Thus, deploying the shaft adapter assembly 98 may include coupling the first adapter head 100A to the first side of the pipe reel 86 (process block 130). In particular, in some embodiments, the first adapter head 100A may be coupled to at least in part by coupling the first adapter head 100A to a first reel end 88A implemented on the first side of the pipe reel 86.

Additionally, as described above, in some embodiments, an adapter head 100 of a shaft adapter assembly 98 may include an adapter shaft 110, which is implemented to be partially inserted into a shaft opening 96 of a pipe reel 86 to facilitate coupling the shaft adapter assembly 98 to the pipe reel 86. Thus, in such embodiments, coupling the first adapter head 100A to the pipe reel 86 may include inserting a first adapter shaft 110A of the first adapter head 100A into a first shaft opening 96 on the first side of the pipe reel 86 (process block 134). Furthermore, as described above, in some embodiments, the first adapter head 100A may include one or more rotation control pins 104, which are each implemented to be inserted between adjacent reel spokes 92 in the first reel end 88A to facilitate tying rotation of the shaft adapter assembly 98 to rotation of the pipe reel 86. Thus, in such embodiments, coupling the first adapter head 100A to the pipe reel 86 may include inserting one or more rotation control pins 104 between adjacent reel spokes 92 on the first side of the pipe reel 86 (process block 136).

Moreover, as described above, in some embodiments, a shaft adapter assembly 98 may include a support shaft 112, which is implemented to be coupled between its adapter heads 100. In particular, in such embodiments, the support shaft 112 may be implemented such that, when deployed at a pipe reel 86, the support shaft 112 runs axially within the reel drum 90 of the pipe reel 86. Thus, in such embodiments, coupling the first adapter head 100A to the pipe reel 86 may include securing the support shaft 112 to the first adapter head 100A (process block 138) and inserting the support shaft 112 through the first shaft opening 96 on the first side of the pipe reel 86 (process block 140). More specifically, in some embodiments, the first adapter head 100A may be secured to the support shaft 112 at least in part by screwing the first adapter head 100A onto the support shaft 112. In other embodiments, the first adapter head 100A may be secured to the support shaft 112 at least in part by inserting and securing a fastener, such as a pin or a bolt, in an opening in the first adapter head 100A and a corresponding opening in the support shaft 112.

In any case, as described above, the shaft adapter assembly 98 may additionally include a second adapter head 100B that is implemented to be coupled to a second (e.g., opposite) side of the pipe reel 86. Thus, deploying the shaft adapter assembly 98 may include coupling the second adapter head 100B to the second side of the pipe reel 86 (process block 132). In particular, in some embodiments, the second adapter head 100B may be coupled to the pipe reel 86 at least in part by coupling the second adapter head 100B to a second reel end 88B implemented on the second side of the pipe reel 86. Additionally, as described above, in some embodiments, an adapter head 100 of a shaft adapter assembly 98 may include an adapter shaft 110, which is implemented to be partially inserted into a shaft opening 96 of a pipe reel 86 to facilitate coupling the shaft adapter assembly 98 to the pipe reel 86. Thus, in such embodiments, coupling the second adapter head 100B to the pipe reel 86 may include inserting a second adapter shaft 110B of the second adapter head 100B into a second shaft opening 96 on the second side of the pipe reel 86 (process block 142).

Furthermore, as described above, in some embodiments, a shaft adapter assembly 98 may include a support shaft 112, which is implemented to be coupled between its adapter heads 100. Moreover, as described above, in some such embodiments, the support shaft 112 may be inserted into the pipe reel 86 along with the first adapter head 100A opposite the second adapter head 100B. Thus, in such embodiments, coupling the second adapter head 100B to the pipe reel 86 may include securing the second adapter head 110B to the support shaft 112 (process block 144). More specifically, in some embodiments, the second adapter head 100B may be secured to the support shaft 112 at least in part by screwing the second adapter head 100B onto the support shaft 112. In other embodiments, the second adapter head 100B may be secured to the support shaft 112 at least in part by inserting and securing a fastener, such as a pin or a bolt, in an opening in the second adapter head 100B and a corresponding opening in the support shaft 112.

In this manner, a shaft adapter assembly 98 may be deployed (e.g., installed) at a pipe reel 86 to facilitate enabling a pipe deployment system 38 to deploy one or more pipe segments 20 in a pipeline system 10 directly from the pipe reel 86. In particular, in some embodiments, deploying the shaft adapter assembly 98 at the pipe reel 86 may enable the pipe reel 86 to be loaded into a pipe deployment frame 72 such that a brake assembly 54 of the pipe deployment frame 72 can be used to control rotation of the pipe reel 86 and, thus, deployment speed of a pipe segment 20 wrapped (e.g., spooled and/or coiled) on the pipe reel 86. Additionally or alternatively, deploying the shaft adapter assembly 98 at the pipe reel 86 may enable the pipe reel 86 to be loaded onto a pipe deployment trailer 42 such that a brake assembly 54 of the pipe deployment trailer 42 can be used to control rotation of the pipe reel 86 and, thus, deployment speed of a pipe segment 20 wrapped on the pipe reel 86.

To help illustrate, an example process 146 for loading a pipe reel 86 onto a pipe deployment trailer 42 is described in FIG. 14. Generally, the process includes moving a pipe deployment trailer to a pipe reel installed with a shaft adapter assembly (process block 148) and engaging the shaft adapter assembly with a brake assembly of the pipe deployment trailer (process block 150). Although described in a specific order, which corresponds with an embodiment of the present disclosure, it should be appreciated that the example process 146 is merely intended to be illustrative and not limiting. In particular, in other embodiments, a process 146 for loading a pipe reel 86 onto a pipe deployment trailer 42 may include one or more additional process blocks and/or omit one or more of the depicted process blocks.

As described above, a pipe reel 86 often rests on the ground before being loaded onto a pipe deployment trailer 42. Thus, to facilitate loading a pipe reel 86 installed with a shaft adapter assembly 98 thereon, the pipe deployment trailer 42 may be moved to the pipe reel 86 (process block 148). For example, in some embodiments, a tow vehicle 40 coupled to the pipe deployment trailer 42 may back up the pipe deployment trailer 42 to the pipe reel 86 installed with the shaft adapter assembly 98.

Additionally, as described above, in some embodiments, the shaft adapter assembly 98 may be aligned with a lifting assembly 52 on the pipe deployment trailer 42 to enable the lifting assembly 52 to lift the pipe reel 86 installed with the shaft adapter assembly 98 onto the pipe deployment trailer 42 (process block 152). To facilitate proper alignment, as described above, in some embodiments, the pipe deployment trailer 42 may include one or more trailer guide plates 106 and the shaft adapter assembly 98 may include one or more corresponding adapter guide plates 108. In fact, in some such embodiments, moving the pipe deployment trailer 42 to the pipe reel 86 on which the shaft adapter assembly 98 is installed may self-align an adapter guide plate 108 with a corresponding trailer guide plate 106, for example, due to interaction between the adapter guide plate 108 and the trailer guide plate 106 resulting from improper alignment pushing the shaft adapter assembly 98 toward the proper alignment.

In other embodiments, a pipe reel 86 installed with a shaft adapter assembly 98 may be loaded onto the pipe deployment trailer 42 at least in part by contracting the pipe deployment trailer 42 around the shaft adapter assembly 98. In other words, in such embodiments, the pipe deployment trailer 42 may have an adaptively adjustable width. Thus, in such embodiments, moving the pipe deployment trailer 42 to the pipe reel 86 may include expanding the width of the pipe deployment trailer 42 (process block 154).

In any case, the shaft adapter assembly 98 installed on the pipe reel 86 may then be engaged with the brake assembly 54 of the pipe deployment trailer 42 (process block 150). As described above, in some embodiments, the shaft socket 64 of a brake assembly 54 may be keyed with one or more flat inner surfaces 66 and the adapter shaft 110 of an adapter head 100, which is implemented to matingly interlock (e.g., interface and/or engage) with the shaft socket 64, may be keyed with one or more corresponding flat outer surfaces 84. Thus, to facilitate matingly engaging the shaft adapter assembly 98 with the brake assembly 54, in such embodiments, the keyed adapter shaft 110 may be aligned with the keyed shaft socket 64 in the brake assembly 54 (process block 156).

Additionally, as described above, in some embodiments, the shaft adapter assembly 98 may be lifted up to the height of the brake assembly 54 of the pipe deployment trailer 42. Thus, in such embodiments, engaging the shaft adapter assembly 98 with the brake assembly 54 may include lifting the shaft adapter assembly 98 and, thus, the pipe reel 86 on which the shaft adapter assembly 98 is installed, for example, via a lifting assembly 52 on the pipe deployment trailer 42 (process block 158). In other embodiments, a pipe reel 86 installed with a shaft adapter assembly 98 may be loaded on the pipe deployment trailer 42 at least in part by contracting the pipe deployment trailer 42 around the shaft adapter assembly 98 and, thus, the pipe reel 86 on which the shaft adapter assembly 98 is installed (process block 160). In this manner, the techniques described in the present disclosure may facilitate enabling a pipe segment to be deployed directly from a pipe reel that does not include an extended reel shaft, which, at least in some instances, may facilitate improving operational flexibility and/or operational efficiency of a pipe deployment system, for example, at least in part by obviating a transfer of the pipe segment from the pipe reel to a pipe drum that includes an extended drum shaft before the pipe deployment system can be used to deploy the pipe segment in a pipeline system.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A shaft adapter assembly comprising:
an adapter head configured to be coupled between a pipe reel and a brake assembly to enable deployment speed of a pipe segment from the pipe reel to be controlled using the brake assembly, wherein the adapter head comprises:
an adapter shaft keyed with one or more flat outer surfaces, wherein the adapter shaft is configured to matingly interlock with a shaft socket on a brake wheel in the brake assembly that is keyed with one or more flat inner surfaces and to be partially inserted through a reel end of the pipe reel; and
a rotation control pin coupled to the adapter shaft via a rotation control plate, wherein the rotation control pin is configured to be inserted between adjacent reel spokes in the reel end of the pipe reel.

2. The shaft adapter assembly of claim 1, comprising another adapter head configured to be coupled to the pipe reel opposite the adapter head, wherein the other adapter head comprises another adapter shaft configured to be partially inserted through another reel end of the pipe reel.

3. The shaft adapter assembly of claim 2, comprising a support shaft configured to be secured between the adapter head and the other adapter head.

4. The shaft adapter assembly of claim 1, wherein the adapter head comprises another rotation control pin coupled to the adapter shaft via the rotation control plate, wherein the other rotation control pin is configured to be inserted between other adjacent reel spokes in the reel end of the pipe reel.

5. The shaft adapter assembly of claim 1, wherein the adapter head comprises an adapter guide plate implemented circumferentially around the adapter shaft.

6. The shaft adapter assembly of claim 5, wherein the adapter guide plate is configured to interact with a trailer guide plate on a pipe deployment trailer to facilitate aligning the shaft adapter assembly and the pipe reel with the pipe deployment trailer.

7. The shaft adapter assembly of claim 1, wherein the adapter shaft of the adapter head is:
keyed with a first flat outer surface, wherein the first flat outer surface is configured to be aligned with a first flat inner surface that is keyed in the shaft socket on the brake wheel; and
keyed with a second flat outer surface that is opposite the first flat outer surface, wherein the second flat outer surface is configured to be aligned with a second flat inner surface keyed in the shaft socket on the brake wheel.

8. A method of implementing a shaft adapter assembly, comprising:
implementing an adapter shaft to be partially inserted through a shaft opening in a reel end of a pipe reel;
implementing a rotation control pin to be inserted between adjacent reel spokes in the reel end of the pipe reel;
securing the rotation control pin to the adapter shaft via a rotation control plate to facilitate tying rotation of the pipe reel to rotation of the adapter shaft; and
keying the adapter shaft with one or more flat outer surfaces to enable the adapter shaft to be matingly interlocked with a shaft socket on a brake wheel that is keyed with one or more flat inner surfaces.

9. The method of claim 8, comprising implementing another adapter shaft to be partially inserted through another shaft opening in an opposite reel end of the pipe reel.

10. The method of claim 9, comprising:
implementing a first adapter guide plate circumferentially around the adapter shaft; and
implementing a second adapter guide plate circumferentially around the other adapter shaft.

11. The method of claim 9, comprising implementing a support shaft to be secured between the adapter shaft and the other adapter shaft.

12. The method of claim 8, comprising:
implementing another rotation control pin to be inserted between other adjacent reel spokes in the reel end of the pipe reel; and
securing the other rotation control pin to the adapter shaft via the rotation control plate to facilitate tying rotation of the pipe reel to rotation of the adapter shaft.

13. The method of claim 8, wherein securing the rotation control pin to the adapter shaft via the rotation control plate comprises:
implementing the rotation control plate circumferentially around the adapter shaft; and
securing the rotation control pin to the rotation control plate.

14. The method of claim 8, wherein keying the adapter shaft with one or more flat outer surfaces comprises:
keying the adapter shaft with a first flat outer surface; and
keying the adapter shaft with a second flat outer surface opposite the first flat outer surface.

15. A shaft adapter assembly, comprising:
- an adapter shaft configured to be partially inserted through a shaft opening in a reel end of a pipe reel; and
- one or more flat outer surfaces keyed on the adapter shaft, wherein each of the one or more flat outer surfaces is configured to align with a corresponding flat inner surface that is keyed into a shaft socket on a brake wheel to facilitate tying rotation of the pipe reel to rotation of the brake wheel.

16. The shaft adapter assembly of claim 15, wherein the shaft adapter assembly is configured to tie rotation of the adapter shaft to rotation of the pipe reel.

17. The shaft adapter assembly of claim 15, comprising:
- a rotation control plate implemented circumferentially around the adapter shaft;
- a first rotation control pin that extends out from the rotation control plate, wherein the first rotation control pin is configured to be inserted between a first pair of adjacent reel spokes in the reel end of the pipe reel to facilitate tying rotation of the adapter shaft to rotation of the pipe reel; and
- a second rotation control pin that extends out from the rotation control plate, wherein the second rotation control pin is configured to be inserted between a second pair of adjacent reel spokes in the reel end of the pipe reel to facilitate tying rotation of the adapter shaft to rotation of the pipe reel.

18. The shaft adapter assembly of claim 15, comprising another one or more flat outer surfaces keyed on the adapter shaft, wherein each of the other one or more flat outer surface is configured to align with a corresponding flat inner surface that is keyed into the shaft opening in the reel end of the pipe reel to facilitate tying rotation of the adapter shaft to rotation of the pipe reel.

19. The shaft adapter assembly of claim 15, comprising an adapter guide plate implemented circumferentially around the adapter shaft.

20. The shaft adapter assembly of claim 15, wherein the one or more flat outer surfaces comprise:
- a first flat outer surface, wherein the first flat outer surface is configured to align with a first flat inner surface that is keyed in the shaft socket on the brake wheel; and
- a second flat outer surface that is opposite the first flat outer surface, wherein the second flat outer surface is configured to align with a second flat inner surface that is keyed in the shaft socket on the brake wheel.

* * * * *